UNITED STATES PATENT OFFICE.

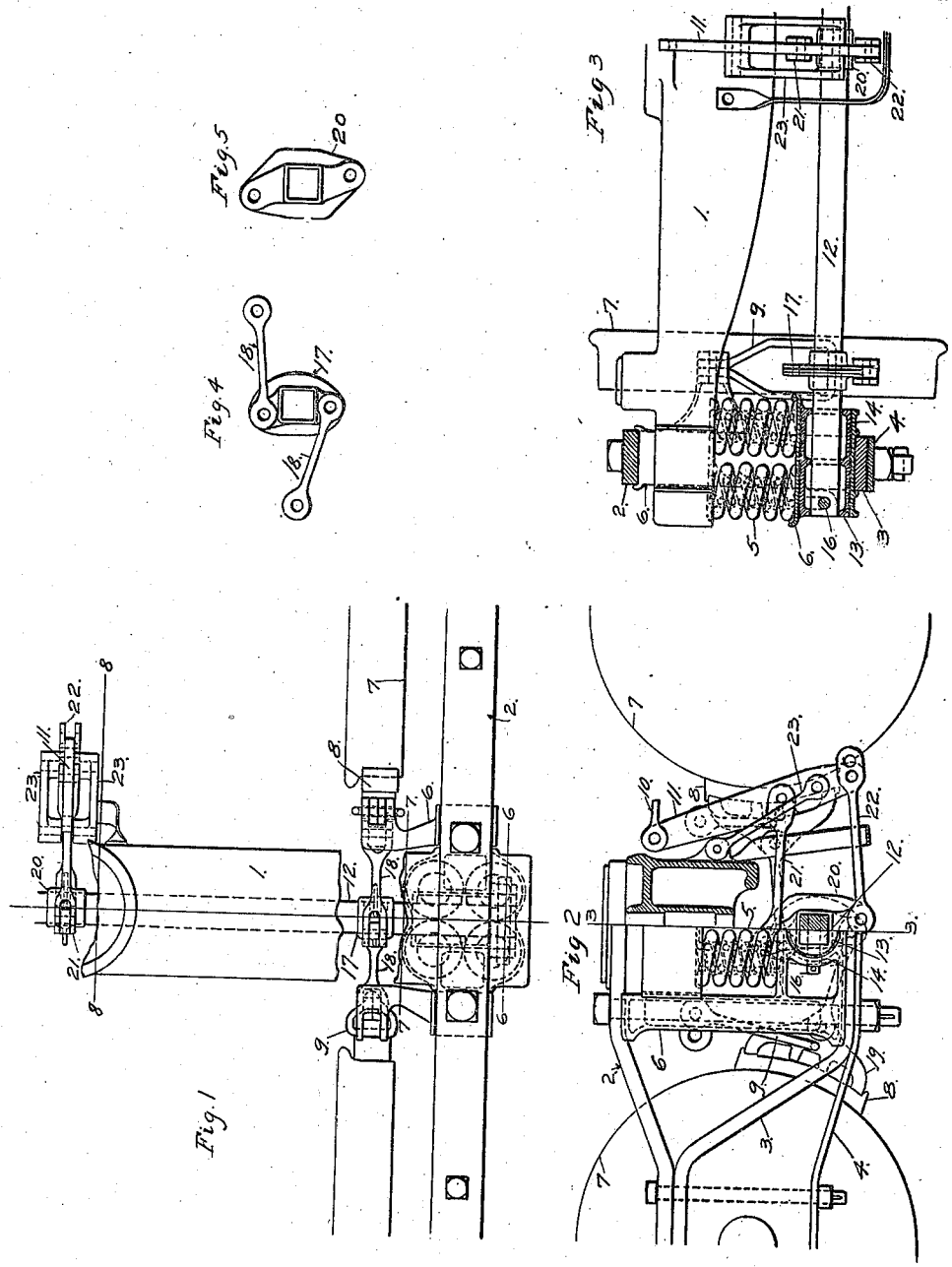

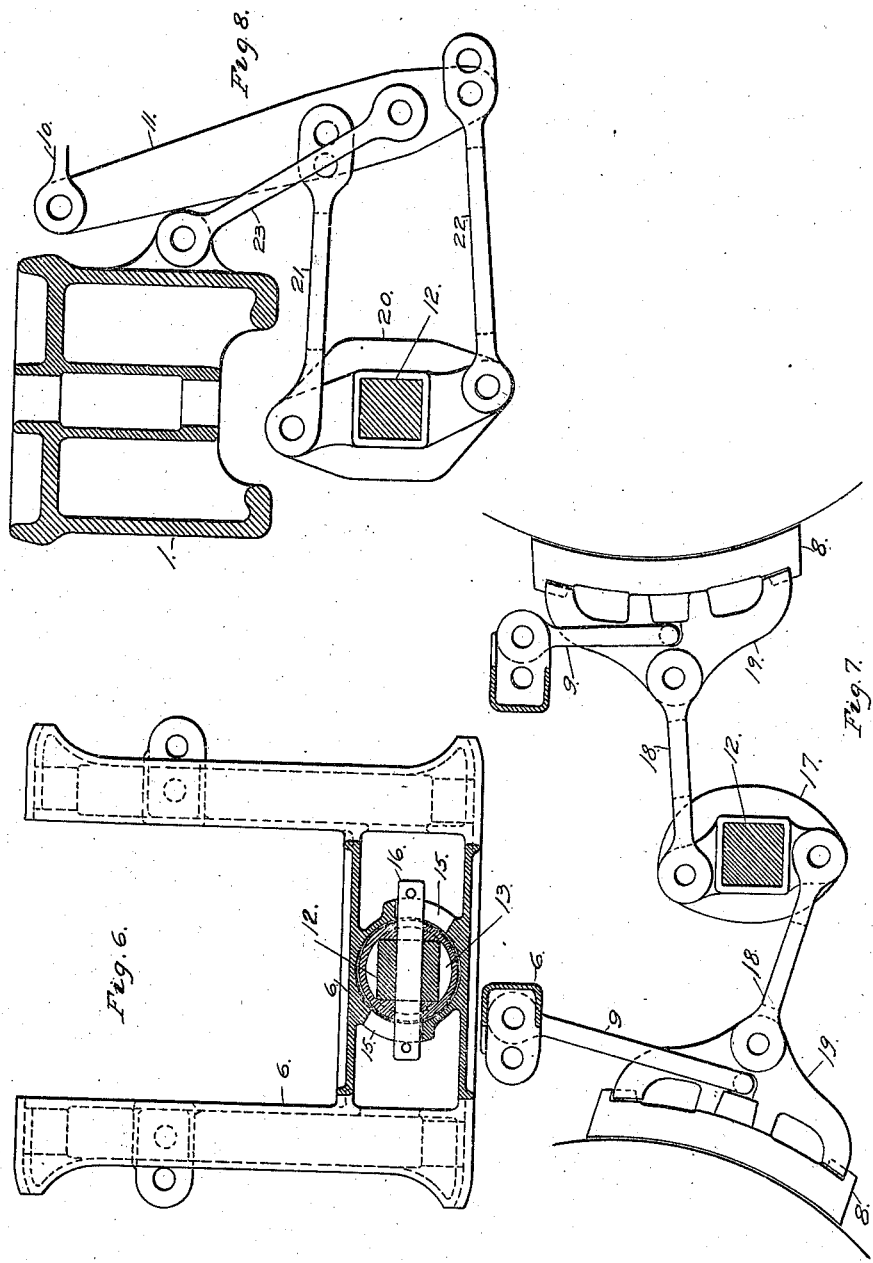

ARGYLE CAMPBELL, OF CHICAGO, ILLINOIS, ASSIGNOR TO ENTERPRISE RAILWAY EQUIPMENT COMPANY, OF CHICAGO, ILLINOIS.

BRAKE FOR RAILWAY-CARS.

963,861. Specification of Letters Patent. Patented July 12, 1910.

Application filed February 5, 1910. Serial No. 542,171.

*To all whom it may concern:*

Be it known that I, ARGYLE CAMPBELL, a citizen of the United States, residing in Chicago, in the county of Cook and State of Illinois, have invented a new and useful Improvement in Brakes for Railway-Cars, of which the following is a specification.

My invention relates to improvements in car truck frames and in brake mechanism for railway cars.

The object of my invention is to provide an improved and simplified construction of car truck frame and brake operating mechanism, in which the operating shaft of the brake mechanism will serve also as the brake beam and as the spring plank for connecting or binding together the two sides of the truck frame.

My invention consists in the means I employ to practically accomplish this object or result. That is to say, it consists in a car truck frame having at each side thereof combined column posts and spring seat members, and a brake operating shaft journaled in said members and serving as a spring plank to tie or bind said members together and also as the brake beam.

My invention further consists in the novel construction of parts and devices and in the novel combinations of parts and devices herein shown and described and more particularly specified in the claims.

In the accompanying drawing forming a part of this specification, Figure 1 is a partial plan view of a car truck frame and brake operating mechanism embodying my invention. Fig. 2 is a side elevation, partly in vertical section. Fig. 3 is an elevation, partly in vertical section on line 3—3 of Fig. 2. Fig. 4 is a detail elevation of the fulcrum arms or levers on the operating shaft which connect with the brake shoes. Fig. 5 is a detail elevation of the fulcrum arm or lever on the operating shaft which connects with the brake lever. Fig. 6 is an enlarged detail elevation of the combined column posts and spring seat member, partly in section on line 6—6 of Fig. 1. Fig. 7 is an enlarged detail elevation, partly in section, on line 7—7 of Fig. 1, and Fig. 8 is an enlarged detail elevation, partly in section, on line 8—8 of Fig. 1.

In the drawing, 1 represents the bolster of a car truck frame, 2, 3 the top and bottom arch bars, 4 a tie-bar, 5 springs, 6 a combined column post and spring seat member at the opposite sides of the car truck frame, 7 the wheels, 8 the brake shoes, 9 brake shoe hangers, 10 the brake rods to be pulled and 11 the brake lever.

12 is my improved brake operating shaft which is furnished at each end with suitable bushings 13 which rotate in suitable bearings 14 on the combined column post and spring seat members 6 at each side of the car truck. The shaft 13 serves not only as an operating shaft for the brake shoes, but also as a brake beam and further as a spring plank to connect the column post and spring seat members on the opposite sides of the car truck. To enable the operating shaft 12 to perform this function of binding or tying the two sides of the truck frame together, that is to say, the two combined column post and spring seat members, I provide the bearings 14 with slot-like openings 15 to receive the pins 16 which are inserted through the operating shaft at its ends, the slots 15 in the bearings 14 permitting the pin 16 to turn or oscillate as required with the shaft 12. The operating shaft 12 is provided with fulcrum arms or levers 17 which are connected by links 18 with the brake shoe heads 19. The brake shoe heads 19 are supported by the hangers 9.

The operating shaft 12 is provided near its middle with a fulcrum arm or lever 20 which is connected by links or rods 21 and 22 with the brake lever 11 which is supported from the bolster by a hanger 23.

In practicing my invention, I prefer that the spring seat and column posts should be formed in one integral piece, instead of in separate pieces, but my invention is not limited to this or any other particular construction of spring seat and column post members.

I claim:—

1. The combination with the spring seat and column post members of a car truck frame, provided with bearings to receive the operating shaft, of a brake operating shaft journaled therein and serving to tie or bind said members together, brake shoes, brake heads and hangers, fulcrum arms on said operating shaft connected with said brake heads, a brake lever and hanger therefor and a fulcrum arm or lever on said operating shaft connected with said brake lever, substantially as specified.

2. The combination with spring seat and column post members of a car truck frame, of a brake operating shaft journaled therein, and serving also as a spring plank for tying and binding together said spring seat members, and as a brake beam for connecting the brake heads, substantially as specified.

3. The combination with column post and spring seat members of a car truck frame, of a combined brake operating shaft, spring plank and brake beam, substantially as specified.

4. The combination with column post and spring seat members of a car truck frame, of a brake operating shaft journaled in said members and tying said members together, said operating shaft being provided with arms connecting with the brake shoes and with a further arm connecting with the brake lever, substantially as specified.

5. The combination with a column post and spring seat members of a car truck frame, of a brake operating shaft journaled in said members and tying said members together, said operating shaft being provided with arms connecting with the brake shoes and with a further arm connecting with the brake lever, said spring seat members having bearings furnished with slots and said operating shaft having pins fitting in said slots, substantially as specified.

6. The combination with column post and spring seat members of a car truck frame, of a combined brake operating shaft, spring plank and brake beam, said column post and spring seat members having bearings to receive said shaft provided with slots and said shaft having pins fitting in said slots, substantially as specified.

ARGYLE CAMPBELL.

Witnesses:
PEARL ABRAMS,
H. M. MUNDAY.